United States Patent [19]

Samuelsen et al.

[11] Patent Number: 4,832,569
[45] Date of Patent: May 23, 1989

[54] GOVERNED VANE WIND TURBINE

[76] Inventors: Eirik Samuelsen, Kunterudvei 6 D, N-3400 Lier, Norway; Sverre Schiotz, Rte. 2, Box 2238, Davis, Calif. 95616

[21] Appl. No.: 36,880

[22] Filed: Apr. 9, 1987

[30] Foreign Application Priority Data

Apr. 11, 1986 [NO] Norway .................. 861418

[51] Int. Cl.⁴ .............................................. F03B 7/00
[52] U.S. Cl. ...................................... 416/17; 416/239; 416/119
[58] Field of Search ................ 416/17, 86, 119, 239, 416/DIG. 4, DIG. 6

[56] References Cited

U.S. PATENT DOCUMENTS

| | | |
|---|---|---|
| 206,631 | 7/1878 | Smith .................. 416/DIG. 6 |
| 665,810 | 5/1900 | Stretch . |
| 1,352,859 | 9/1920 | Wilson . |
| 1,791,731 | 2/1931 | Madarasz . |
| 1,835,018 | 10/1926 | Darrieus . |
| 3,504,988 | 4/1970 | Stenner . |
| 4,302,684 | 10/1981 | Gogins . |
| 4,619,585 | 10/1986 | Storm .................. 416/119 |
| 4,684,817 | 8/1987 | Goldwater .................. 416/119 |

FOREIGN PATENT DOCUMENTS

2468002  5/1981  France .................. 416/119

Primary Examiner—Henry A. Bennet
Attorney, Agent, or Firm—Leonard Bloom

[57] ABSTRACT

Wind energy converting machine comprising a solid rotating ring carrying airfoils which are governed to have an optimal angle of attack to the wind approaching each of them when the wind velocity is below a chosen limit. In stronger wind the angles of attack are decreased to limit the power uptake. The ring is supported by stationary rollers which act as friction wheels to transfer the power to electric generators or the like. An example is described in which 90 airfoils, 30 meters high and with 3.6 meters root chord, perform a track of 200 meters diameter, at a speed of 8 m/sec. This turbine is calculated to produce 3.75 megaWatt in a wind of a velocity of 10 m/sec. or higher.

23 Claims, 6 Drawing Sheets

GOVERNED VANE WIND TURBINE

BACKGROUND OF THE INVENTION

1. Field of the Invention

This invention relates to wind machines for converting wind energy into such forms that can be useful for different purposes, such as electric power, or pneumatic or hydraulic power accumulated in a fluid under pressure. In this respect it has its aim in common with the well-known windmills, which may produce electric power, or pump liquids, or do other useful work, according to what devices are connected to the shaft of the mill.

More specifically, the invention relates to such machines which have a vertical axis of rotation, and, still more specifically, to the kind of such machines in which there is found no stationary structures, nor a vertical shaft extending substantially above ground level.

2. Description of Prior Art

| | |
|---|---|
| 665,810 | Stretch |
| 1,352,859 | Wilson |
| 1,791,731 | Madarasz |
| 1,835,018 | Darrieus |
| 4,302,684 | Gogins |
| 3,504,988 | Stenner |

In addition to the conventional type of windmills, whose somewhat twisted blades radiate from a hub on a horizontal shaft, (Horizontal Axis Wind Turbines, or HAWTs), there is known different types of wind machines with a vertical axis of rotation (or VAWTs). One of the kind was described by Wilson (U.S. Pat. No. 1,352,859), another by Darrieus (U.S. Pat. No. 1,835,018). At present, there is known several structures with a number of vertical airfoils supported by a system of horizontal spokes radiating from a hub which is supported on the top of a bearing structure, and which hub, in turn, transfers a torque from the airfoils to a vertical shaft.

With the structure described by Wilson as one exception, most VAWTs have airfoils which perform their circular movement with their foils maintained in a fixed position relative to the axis, but some of them include mechanical devices which make the foils deviate somewhat inwards and outwards from a tangential course, in order to decrease the torque while the rotor runs at a moderate speed relative to the wind velocity. Other precautions to increase the torque, or to facilitate the starting-up of the turbine, are known in different forms of VAWTs which have a real vertical shaft extending into the air.

In addition to these VAWTs, a few wind machines are suggested in which the vertical shaft is done away with. Instead, the structures on which the wind acts are mounted on a platform rotating on a system of wheels, or on a number of vehicles which perform a closed loop. Stretch (U.S. Pat. No. 665,810) described such a platform, which could be put in rotation by sails. According to J. D. Madarasz (U.S. Pat. No. 1,791,731), the structures collecting the wind forces may be rotating cylinders which utilize the Magnus effect to create a force oblique to the wind direction. Laird Gogins (U.S. Pat. No. 4,302,684) suggested a system of vertical airfoils supported on cars that travel around a fixed-loop track. If this track was chosen to be a circular one, instead of his specified elongated track, his system would have another feature in common with those of Stretch and Madarasz.

All of these wind machines have their draw-backs, even if most windmills perform to satisfaction the conversion of wind energy for the particular purpose they are built for. A most striking feature of all HAWTs is their inherent limitation of being scaled up for greater power production. This limitation exists because the area swept by the blades, and hence the power extracted from a wind of a certain velocity, increases with the second power of the linear measures, whereas the necessary strength of the supporting structure, and the moment of resistance of a cross section of it, as well as the quantity of construction material consumed for its erection, all increase with the third power of the linear measures. Consequently, the cost of building such a structure increases more rapidly than the energy it will convert, when the linear measures are increased. Even with the use of modern materials of construction, and by applying modern aerodynamic theory and experiences in their construction, there is an economical limit for the size of the HAWTs. Much the same is true for the VAWTs, even if more moderate quantities of construction materials, and pieces of equipment, are put aloft by their erection, because most mechanical and electrical devices may be kept at ground level. In general, the VAWTs now known can not, either, to an advantage, be scaled up beyond a certain limit.

Aerodynamically, both types operate most efficiently with a certain ratio of their vanes' tip speed to the wind velocity, and consequently they tend to speed up with increasing wind velocity. If they are coupled to an electrical AC generator which, in turn, is connected to an extended network, their speed of rotation have to be constant, if any intricate and expensive pieces of equipment, mechanical or electrical, are not added to the system, to allow for a speed variation. Another precaution sometimes found necessary has been to install brakes to take up surplus energy in heavy winds, and in other cases the windmill has to be put to a standstill when the wind velocity exceeds a certain limit.

Regarding the VAWTs in which the vertical shaft is done away with, they have in common the feature of one or more electric generator(s) being carried around with the rotating platform or with the vehicles, while they are driven by the wheels on which the structure run. As a consequence of this feature, the electric current produced by the generators have to be transferred to the external network through moving contacts, which has to be considered as an inherent drawback of these systems.

OBJECTS AND SUMMARY OF THE INVENTION

1. Objects of the invention.

It is an object of the present invention to provide a wind energy converting machine without an inherent limitation of its being scaled up for a high energy production. It is also an object of the present invention to provide such a machine which can operate under winds of high velocity, and of any direction.

It is another object of the present invention to provide such a machine which can operate in connection with conventional, stationary electric generators which, in turn, can feed external networks without any moving electric contacts.

It is also an object of the present invention to provide rules for an optimal operation of the wind turbine under the influence of winds of different velocities.

Further advantages will be obvious as more detailed emobidments of the invention are described hereinbelow.

2. Summary of the invention.

The present invention is a wind turbine with a vertical axis of rotation, without any structure other than a number of vanes, hereinafter called airfoils, extending substantially above ground level. The turbine comprises a circular structure which is supported, substantially at ground level, in a way that allows it to rotate. This circular structure may be a disk or platform supported centrally by a bearing, but because its diameter preferably has a considerable extension, it is preferred that even such a central bearing is done away with, so that the structure takes the form of a main ring supported by a number of wheels or rollers. In this case, the function of the central bearing to prevent any horizontal displacement of the structure has to be fulfilled by other constructive elements.

Along the circumference of the circular structure, or along a circle line on the main ring, there is arranged a number of airfoils extending into the air. The airfoils are, separately, connected to the main ring by a bearing which allows each foil to revolve around a vertical axis relative to the rotating main ring. The angle between the direction of a foil's chord and the direction of the wind is determined by a governing system, according to the foil's position on the circular track relative to the wind direction, and to the wind velocity. Hence, in moderate winds it is possible to choose, for each position of the airfoils within the circular track, an optimal angle of attack toward the wind, and thus maximize the power output, whereas in heavy winds the angles of attack may be reduced so that the forces from the airfoils, as an assembly, do not exceed what is necessary to run the generators at their rated capacity.

By this precaution the forces exerted upon the foils in extremely heavy winds will be very close to what a zero angle of attack determines, but an amount of energy appropriate for the generators will be extracted from the wind of any velocity above a certain value. Thus, no other precautions, not any shut-down, are necessary in heavy winds.

The forces exerted on the airfoils by the wind are transferred, through their bearings, to the main ring, as a torque that will cause it to rotate. It is a part of the invention to transmit further these forces by mechanical means only, to the final energy converter(s), which are, preferably, electric generator(s) of conventional design. The circular structure may comprise a number of vehicles linked together to form a closed loop, and supported by the wheels of their own. In such a case it is a prerequisite of the invention that the structure also comprises a real, coherent ring attached to the vehicles, so that the forces from the airfoils, averaged along the whole loop within this ring, may be transferred, via cogwheels meshing with indentation of the ring, or via friction wheels kept in contact with the ring, or by other mechanical means, to the final energy converter(s). It is preferred, however, that the circular structure supporting the airfoils in itself is a coherent ring, in which case it may to an advantage be supported by a number of stationary rollers, of which all or a limited number then simultaneously act as friction wheels to transfer further the forces to the final energy converter(s).

The features of the wind turbine hereinabove described are considered to define the scope of the invention in general, relative to Prior Art. A number of further details are disclosed hereinafter, which may be of particular advantage in different embodiments of the invention.

DESCRIPTIONS OF THE DRAWINGS OF THE CONSTRUCTIONS

FIG. 1 is a schematic drawing of slightly more than one quadrant of a wind turbine according to a particular embodiment of the invention, as viewed obliquely from above. 1 is the circular structure in the form of a ring, supported by, and free to rotate on a number of stationary, conical rollers 2 (three indicated). Said rollers have their bearing surface divided in two parts, between which a bearing 4 is arranged to transfer the weight of the whole structure to the ground. The ring is prohibited from moving radially by a number of rollers 5 (one shown), having substantially vertical axes and being fixed to a grounded structure 6 surrounding the turbine. A number of airfoils 7 (seven shown) are arranged on the circular structure, the bases of which airfoils comprises bearings 8, 9 which permit each airfoil to revolve about a vertical axis. Devices to perform such a revolving of the airfoils include, for each airfoil, a positioning motor 11 with a worm screw 10 (one of each shown) meshing with a toothed wheel 12 on the base of each airfoil.

FIG. 2 shows a preferred embodiment of one of said conical rollers 2. Each of the two parts in which the bearing surface of the roller is divided, has an outer frictional lining 21. The outboard part of the roller is provided with internal teeth 22 of a planetary gear, meshing with the gearwheel 23 of a driven shaft 24. The roller 2 is supported by an intermediate bearing 25, in which the roller is free to move axially to some extent. The intermediate bearing 25 is a middle part of a bell crank type framework structure 26, one side of which is, in turn, supported in a grounded bearing 4, the axis of which coincides with that of the driven shaft 24. The opposite side of the said framework structure 26 is supported by a device 28 capable to turn the structure 26, together with the intermediate bearing 25 and the roller 2 itself, to some extent, around the grounded bearing 4.

Both types of air foils shown in FIGS. 3 and 4 are tapered off upwards, from shortly above their bases, both in a side view and in a front view.

Common to the airfoils shown in FIGS. 3, 4, and 5 are their circular bases 31, which connects the bearings 8, 9 shown in FIG. 1, via an intermediate section 32 with the main airfoil.

The FIGS. 7 trough 12, which do not illustrate constructive details of the invention, are appropriately commented on hereinbelow in connection with the directions for operating the wind turbine.

FURTHER DETAILS OF THE INVENTION

1. The airfoils and the governing of their angles.

Although they are so essential parts of the present invention, the airfoils may, however, be of quite different forms, as is indicated above, and their method of construction may vary considerably. Any flat surface may, in principle, function as an airfoil, because when it is struck by the wind under an oblique angle, there will be created a force deviating in direction from the undisturbed wind's course.

Figures 3, 3B:
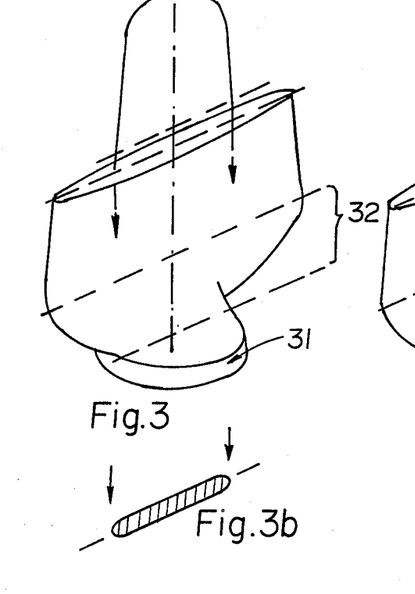
FIG. 3 shows in outline an airfoil whose profile, shown in FIG. 3b, has a double symmetry.
Figure 7:
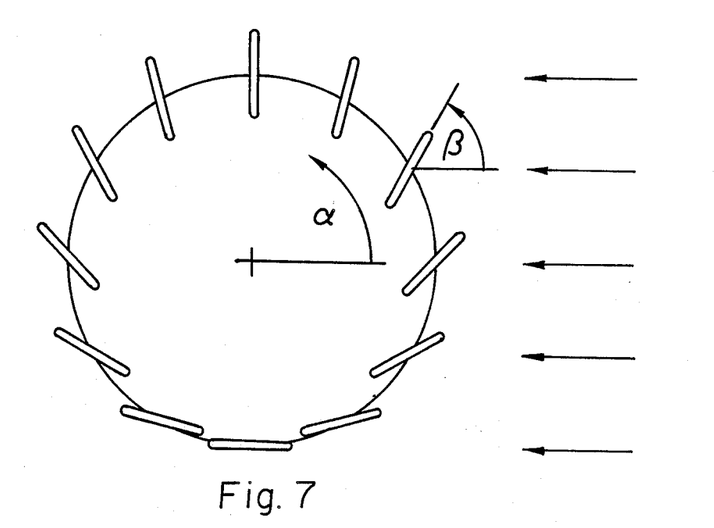

It is within the scope of the present invention to make use of airfoils having a double symmetry, such as shown in FIG. 3, and, simultaneously, to govern the airfoils to follow a pattern as sketched in FIG. 7. In this case each foil will make one half of a rotation during one of its circular path, and the foil's two edges will alternately be the leading one. Such a pattern was previously suggested by Wilson (cited above) for a VAWT with an extended, central shaft. In light winds, the airfoils moving leeward and exposing most of their area to the wind, will take up relatively minor forces if the peripheral velocity really approaches the wind velocity, and then considerable contributions to the torque of the turbine should come from the foils that have oblique angles to the wind direction. In heavy winds, however, there will be very strong forces exerted upon the foils which expose most of their area toward the wind. Thus, this pattern seems less suitable if the turbine is to be operated with a constant speed of rotation. In addition, airfoils with a double symmetry are less effective in creating component forces perpendicular to the wind direction.

In accordance with aerodynamic terminology these component forces are spoken of as lift forces, although, as is the case in connection with VAWTs, their directions are substantially horizontal. The component forces in the wind direction are correspondingly called drag forces. For use as a component structure in a wind turbine according to the present invention preference is given to such airfoils which are known, by experience or by calculations, to give high lift components relative to the drag components, for certain angles of attack. Both the sail of a ship and the wing of an aircraft fulfill this requirement, and the use of airfoils resembling any of them is within the scope of the present invention, without a preference for any of the two types.

Figures 4, 4B:
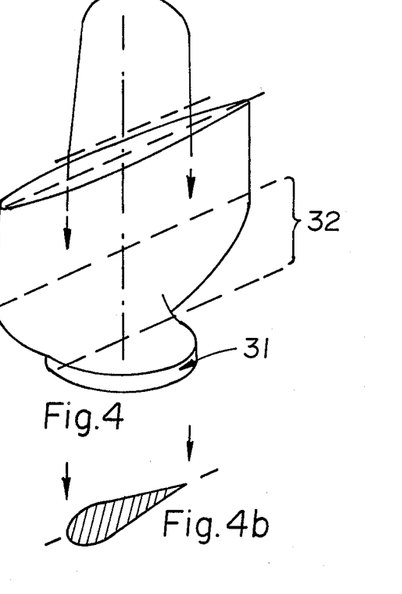
FIG. 4 shows in outline an airfoil whose profile, shown in FIG. 4b, has a mirror image symmetry, with a rounded leading edge and a sharp trailing edge. The contour of the airfoil, viewed sideways, is slightly slanted backwards, so that the center of the wind forces will be found somewhat behind its axis of rotation.
Figures 5, 5B:
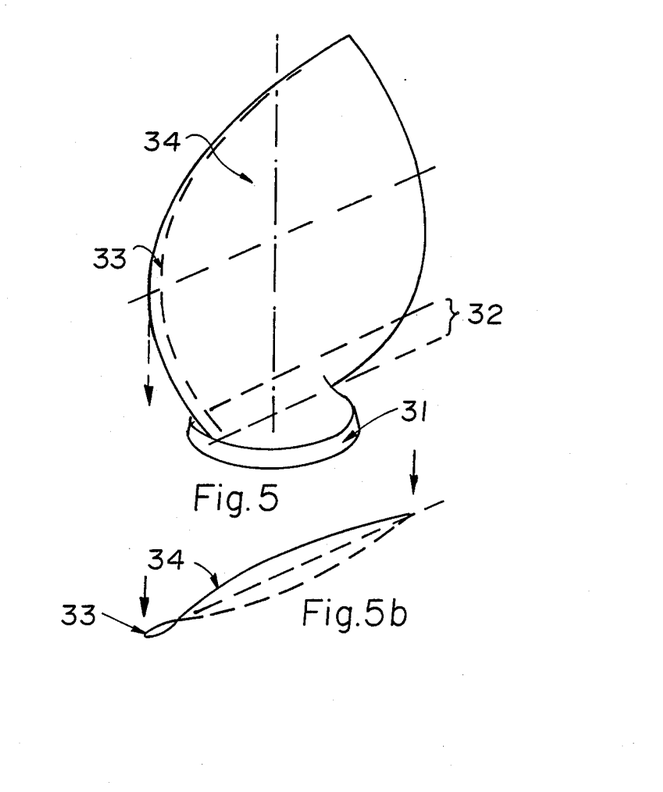
FIG. 5 shows in outline an airfoil whose profile, shown in FIG. 5b, has no symmetry, but a curved form with a certain resemblance to both a sail and to a curved wing of an aircraft. It is a prerequisite that it may, or may be caused to, flip over from one stable form to that of its mirror image, such as indicated by a dotted line in FIG. 5b, according to the side from which the wind approaches the foil. The airfoil is a combination of a curved mast 33 in the leading edge of the airfoil, and a comparatively thin and flexible cloth or foil 34 in the rest of the airfoil.

Because the airfoil must function equally well with the wind approaching it from either side, a foil most like an aircraft's wing must have a profile which is symmetrical about its chord, as is shown in FIG. 4. Actually, a number of wing profiles of this kind are known, as are coefficients for the lift and drag forces they create. An airfoil more or less a hybrid between an aircraft's wing and a sail is shown in FIG. 5, which shall have the flexibility to flip over from one curved form to its mirror image form, as when a ship is tacking, according to which side of it the wind approaches. Such an airfoil may be of particular advantage as a component structure in a turbine according to the present invention.

When the wind force acting on an airfoil is decomposed in lift and drag forces, these components will, in turn, have partial components in the tangential direction of the airfoil's course. The drag component will give a positive contribution to the torque in certain sectors of the track and negative in others. The sum of the tangential components, which makes the turbine move against the load, is a variable, depending on the airfoil's position in its circular track and its angle toward the wind, and, in addition, on the velocity of the wind and the peripheral velocity of the foil. The latter two determine in reality the velocity as well as the direction of the wind approaching the airfoil, to which direction the angle of attach of the airfoil has to be referred.

It is part of the present invention to give instructions for the governing of the airfoils' angle relative to the undisturbed wind's course, under different wind velocities and speeds of rotation of the turbine; both for maximizing the energy uptake in the more frequent light and moderate winds, and for limiting the power uptake and the forces acting on the airfoils in the less frequent heavy winds. A prerequisite for following the instructions is that pairs of relative values for lift and drag forces are known for the foil in question, for angles of attack up to at least the critical angle of stalling. The pairs of relative force values may be the lift and drag coefficients for a certain wing profile, or they may be sets of experimental data from a model foil tested in a wind tunnel. It is preferred that the values are available explicitly from curve-fitted formulas.

Figure 8:
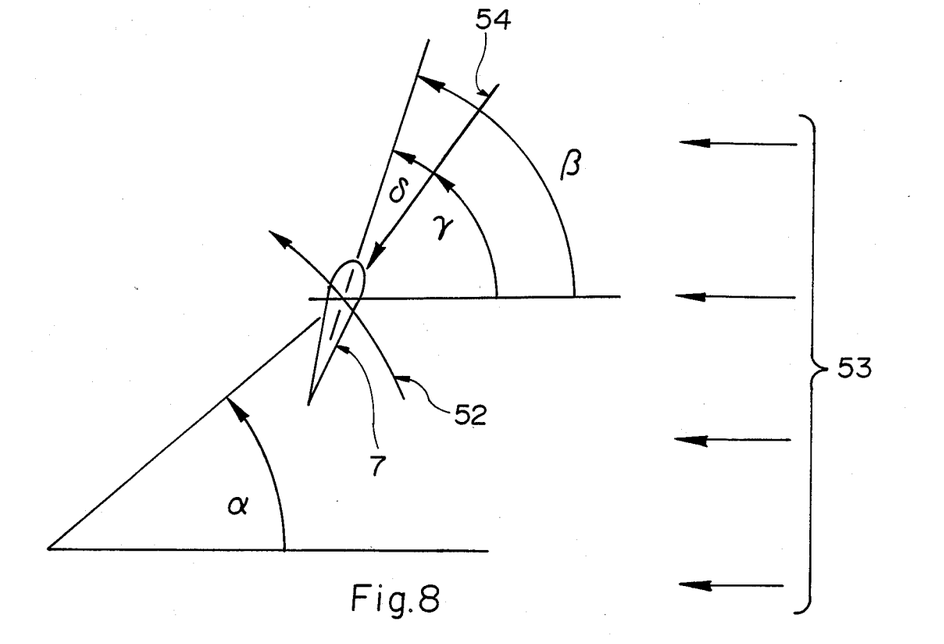

FIG. 8 shows, in general, the wind conditions around an airfoil 7 which performs a circular movement, indicated by the curved arrow 52, in a wind of an undisturbed direction indicated by arrows 53. The angle Alpha determines the position of the foil in the circular track 1, relative to the wind direction, and the angle Beta is the angle of the airfoil's chord, with the same reference. Due to the foil's own motion, it will be approached by a resultant wind, indicated by the arrow 54, deviating with an angle Gamma from the undisturbed wind course. The angle between the foil's chord and the resultant wind, i.e. the difference between Beta and Gamma, is the real angle of attack of the airfoil toward the wind approaching it, which, in FIG. 8, is denoted Delta.

Further, when V denotes the wind velocity and P the peripheral velocity of the airfoil, the angle Gamma is determined by the formula I Gamma=arctang (cos Alpha / (R−sin Alpha)), where

II R=V / P

The velocity of the resultant wind approaching the airfoil, denoted by W, will be III W=square root of (V∧2+P∧2−2*V*P*sin Alpha)

It will be understood that when R<1, i.e. when the wind blows slower than the turbine turns, there will be a sector of Alpha, around 90 deg. from the wind's direction, where the airfoils will overtake the wind, and the drag forces will counteract the rotation of the turbine.

In this sector the angle Gamma will be greater than 90 deg.

Further, denoting any pair of relative values for the lift and drag forces by L and D respectively, it will be understood that their components in the tangential direction of the airfoil's movement, denoted by TL and TD respectively, may be expressed by the formulas IV TL=L * cos (Alpha−Gamma), and V TD=D * sin (Alpha−Gamma)

Now, L and D depend on the foil's angle of attack, and there will be one value of that angle which maximizes the sum TL+TD. Because L and D are empirical in nature, this maximum can only be found by incrementing the angle of attack, in principle from a zero value, and calculating TL and TD according to the formulas IV and V, until a maximum of the sum is found. The optimal angle of attack thus found is now denoted by Delta, and an optimal foil angle is correspondingly given by VI Beta=Gamma+Delta By further applying these rules of calculation for a sufficient number of positions of the airfoil the whole track around, an optimal pattern of the airfoil's angles is determined. It should be noted that these calculations are highly facilitated by the fact that when Alpha is increased from −90 to +90 deg., or decreased from +270 to +90 deg., Delta steadily increases also, so that incrementing the angle of attack for finding Delta may always start with the value of Delta found for the previous value of Alpha. Actually, from a zero value for alpha equaling −90 (+270) deg., Delta increases more or less steeply, according to different values of R, toward somewhat of a plateau value close to the stalling, or critical angle of attack for the foil in question.

Because the velocity ratio R determines the angle Gamma for any given value of Alpha, the optimal patterns for the airfoil's angle Beta is dependent on R only, for a given type of airfoil. In fact, a system of such patterns is a transformation of the information given by the curves of the L and D coefficients, by the use of the ratio R and trigonometrical functions, for this particular use of the airfoil in a wind turbine according to the present invention.

Figure 9:
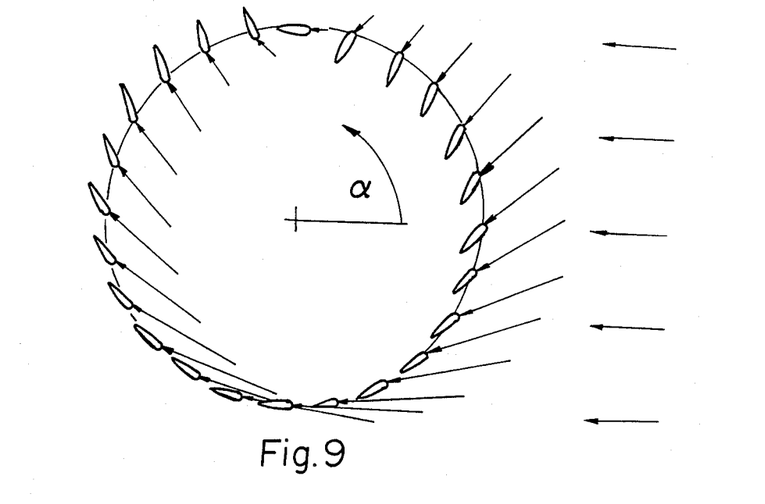

It will be understood that the optimal pattern will differ in one respect according to the ratio R being larger or smaller than unity. In FIG. 9. the optimal pattern for the movement of an airfoil is shown when the ratio R is 1.25. In the figure is also indicated, by a system of arrows, the direction and the magnitude of the resultant wind approaching the airfoil. The airfoil's angle Beta goes through a maximum in the first quadrant before it returns to zero in the position of Alpha=90 degrees. In the second quadrant Beta then takes negative values, goes through a maximal negative value, and becomes zero again when Alpha goes through 270 degrees.

Figure 10:
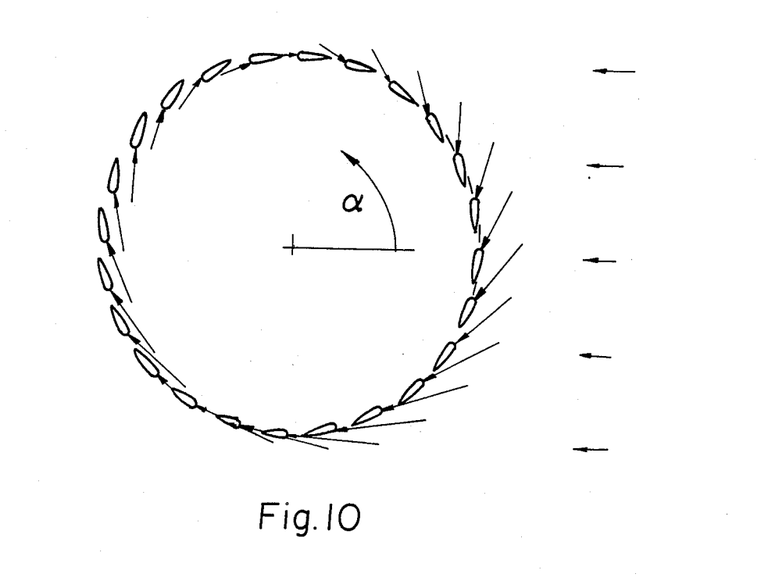

When R is less than unity, however, Beta steadily increases in the first quadrant, to become 180 degrees in the position of Alpha=90 degrees, as is shown in FIG. 10 for R=0.5 (direction and magnitude of the resultant wind are also here indicated by arrows). In the second quadrant Beta still increases beyond 180 degrees, which in reality equals negative values, goes through the value 270, which equals −90 degrees, and assumes a pattern more like that for R>1 in the rest of the track.

The difference between the two patterns is, however, not a fundamental one. It will be understood that the position of Alpha=90 degrees is a singularly point for R=1, in which formally a whole turn of the foil is performed. This peculiarity reflects the physical conditions when the airfoil exactly follows the undisturbed wind in direction as well as in velocity, as Beta then is mathematically undetermined.

When R is in the vicinity of unity, it is advisable to specify a non-ideal course for the foil to follow in a smaller sector of the whole track, for instance 15 degrees to both sides of Alpha=90 degrees, in which sector the contributions of the wind forces to the total energy conversion is negligible. One practical reason for adopting a non-ideal course for Beta in this sector is to avoid the high speed of rotation of the airfoil, relative to the main ring, which the ideal course would demand, and which the positioning system may not be able to perform. A suitable principle for such a non-ideal course is that the foil's angle Beta shall pass through the value zero when R is greater than unity, i.e. that the leading edge of the foil shall be pointed windward when the wind velocity exceeds the peripheral velocity, and that Beta shall pass through the value 180 dg. when R is less than unity, i.e. that the leading edge shall be pointed leeward when the wind velocity is less than the peripheral velocity.

Contrary to what is the case of the pattern shown in FIG. 8, the pattern shown in FIG. 10 will cause only minute drag forces to be exerted upon the airfoil moving faster than the wind in a sector around Alpha=90 degrees. In reality, the pattern makes possible an extraction of wind energy to a great extent even from winds of lower velocity than the peripheral speed of the airfoils. This feature is fairly unique for the present invention.

On the other hand, when the wind velocity exceeds certain values, the efficient conversion of its energy, which is made possible by the pattern according to FIG. 9. and by the computation rules given above, may exceed the capacity of the electric generators connected to the system. In that case the positioning system for the airfoils can easily be used to realize a pattern for the airfoil's angle Beta so that the angle of attack is less than the optimal one, for any position of the foil in its track. In order to make the least alterations in the formula system given above, one can to an advantage substitute, for the optimal Delta, and angle Delta*, denoting a maximal angle of attack, according to a precalculated table of values versus any values of R higher than a chosen limit.

2. Practical aspects regarding the airfoils.

The bending moment caused by the wind forces in the airfoils decreases rapidly with the height, and regardless of how the foil is built, the use of materials of construction should, to an advantage, diminish toward the top, as the moment vanishes. The airfoils shown in FIG. 3. and 4. are tapered off upward, both in a front and a side view, according to this principle.

On the other hand, the wind velocity will normally increase with the height above ground level, and it will accordingly be of advantage to have as much as possible of the foil area at an elevated level. This may be combined with the principle mentioned above by increasing the width of the airfoil from its base up to a certain height, from where the tapering off then takes place. The airfoil shown in FIG. 5. illustrates this principle.

Figure 6:
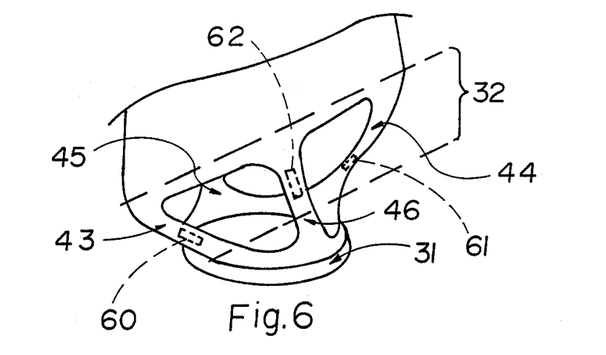
FIG. 6 shows a preferred embodiment of the intermediate section 32, which comprises four separate legs portions 43, 44, 45 and 46. Two of them lean outwards from the circular base to the end points of the foil's chord, while the other two connect the circular base of the foil with intermediate points on the rim of the foil's profile.

For the case that the turbine will be exposed to an extremely heavy storm, which would cause wreckage to most structures extending into the air, it is a particular feature of the present invention to make use of airfoils built according to FIG. 6, with the specification that the legs, as shown in a number of four, or more, represent the weakest parts of the structure, in which a rupture will take place in case of a certain overload. In this way one will experience what may be called a controlled wreckage which may leave undisturbed all of the essential equipment situated near ground level.

In the formula system given above for the positioning of the airfoils along its track, there is a number of parameters, the actual values of which must be available for the positioning system to fulfill its task. Thus, the direction of the undisturbed wind determines the point on the turbine's circumference where the angle Alpha shall take the value zero, and, further, the wind velocity occurs in the expression for Gamma. It is obvious that these parameters may be measured by known and conventional weather instruments. It must be noted, however, that in order to avoid any influence from the turbine itself on these measurements, the instruments must either be placed at a level well above the height of the airfoils, for instance in the center of the turbine, or the instruments must be duplicated a number of times around the turbine, so that the one or the ones in windward position always may be in operation.

It is, then, also a part of the present invention to install in the turbine itself such devices, strain gauges or load cells, that will give the proper signals to the positioning system. Preferably the signalgiving devices indicated as 60, 61, and 62 (a fourth device not shown) are located on or in the legs of the airfoils shown in FIG. 6. When equal strain in the two side legs is signaled, by device 62 and the one not shown after a higher signal in one specified leg according to the way of rotation, it means that no lift force is present, and it should be interpreted as the airfoil being in the 270 degrees position relative to the wind direction. Every such signal can then be used to reset the governing system for another 360 degrees track of the foil, which is equivalent to taking a signal from an external wind direction instrument into account. Likewise, devices 60 and 61 located in or on the fore and hind legs of the airfoil may give signals about the magnitude of the wind forces, which signals, preferably from the airfoil in the 270 degrees position, may be interpreted as a measure of the wind velocity. The same devices and the signals transferred from them in any suitable and known way to the positioning system may in addition be of value in controlling the performance of the turbine as a whole.

Finally, as a parameter in the positioning system for the airfoils, the peripheral velocity of the foils has to be known. If the turbine is to drive one or more generators connected to an external AC network, this parameter is to be given a constant value once and for all, if no intricate and expensive devices, mechanical or electrical, is added to the system. Moreover, this parameter is of the greatest importance for the power output of the turbine, because the effect taken up from the wind is the tangential force for each airfoil times this peripheral velocity. Its values should be chosen according to the time distribution of the wind velocities for the site in question, in order to have an economic sound decision made for the power capacity of the turbine and the electric equipment as a whole.

2. The circular structure and its supporting.

Figure 1:
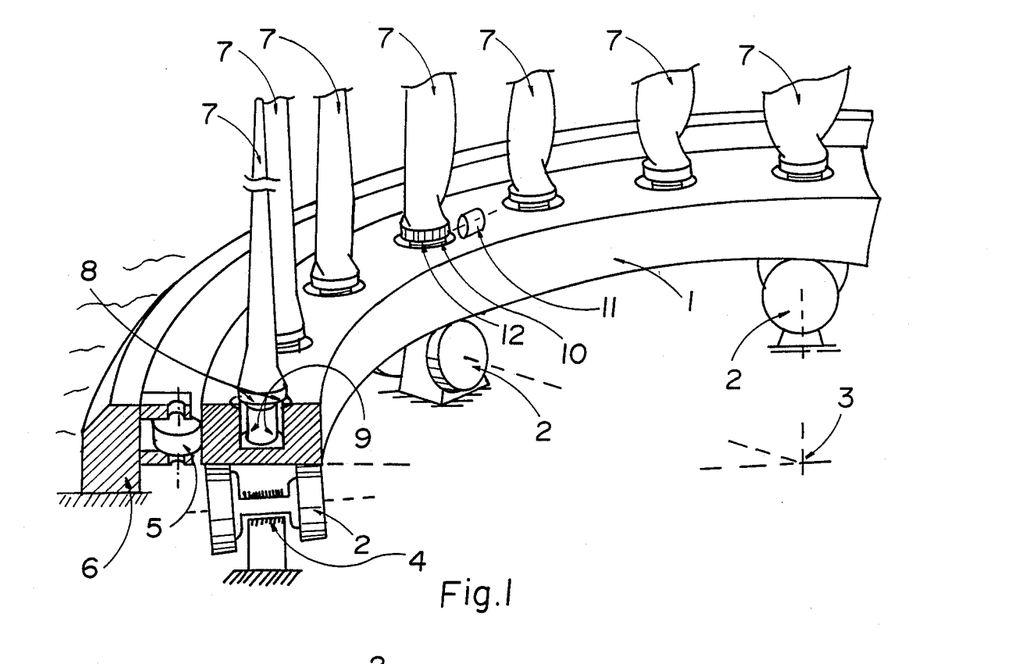

The aim of the circular structure 1 is to support the airfoils 7, and in doing this, to collect the forces acted upon them by the wind, and to transfer the same forces further via mechanical devices to some energy converting machines, such as electric generators. A preferred embodiment of the invention is to support the circular structure 1 by a number of rollers 2 on which this structure may rotate, of which rollers at least one simultaneously constitute the mechanical means for the further transfer of the forces. The lower, supported surface of the circular structure may then be a short segment of a broad cone, but preferentially it should be plane and horizontal. Further, the rollers 2 should be conical of shape, and their vertices should coincide in the center of the supported surface, so that the points of contact between the supported and the supporting surfaces always have substantially the same speed. The bearing surface 21 of the rollers 2 should have a friction lining to secure the transfer of the forces. It may be of advantage to divide the bearing surface of the rollers into two parts, between which the bearing of the rollers are arranged, so that the two ends of each roller are free to make space for planetary gears etc. The features here mentioned are all shown in FIG. 1, which also shows devices of the governing system, viz. a positioning motor 11 with a worm screw 10, and a grounded, surrounding structure 6 on which rollers 5 are provided to prohibit any radial movement of the structure.

Figure 2:
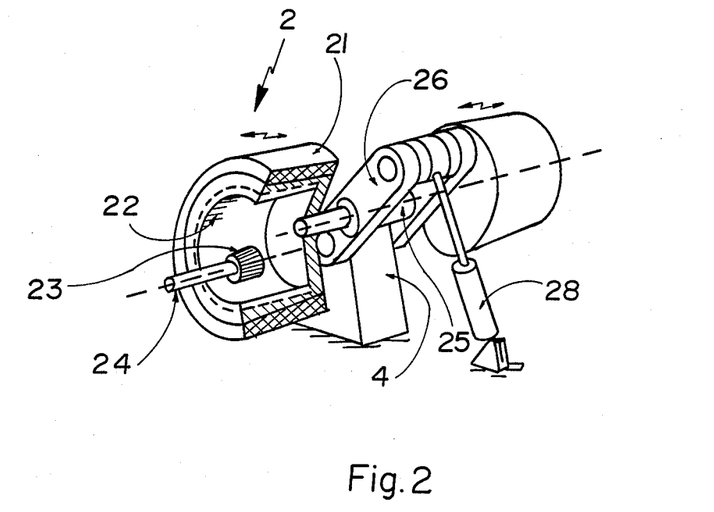

There may be reasons for disconnecting the power-transmitting rollers from contact with the rotating circular structure. It is a part of the invention to include such arrangements of the rollers and their bearings that this is made possible. In FIG. 2 such an arrangement is shown, in which the device 28, turning the bellcrank type framework structure 26 to some extent around a bearing 4 displaces the bearing 25 of the roller to some extent in a vertical direction. Provided the axes of the bearing 4 coincides with the axes of the driven shaft 24, a displacement as mentioned may take place without the connection between the roller and the driven shaft being disturbed. When a disconnection as here described is to be performed, the weight of the rotating structures have to be taken up by adjacent rollers, preferably by a pair of idle rollers situated close to the displaced one.

If one or more electric AC generators are included in the system, there is a need to synchronize their voltage with that of the external network before electric connection is established. It is a part of the invention to arrange for the possibility of small variations in the speed ratio of the individual generators to that of the rotating, circular structure 1. One preferred arrangement to meet this need is also shown in FIG. 2, in so far as the roller 2 may be displaced to some extent in the direction of its own axis in its bearing 25. Devices to perform such a displacement may be of any kind previously known per se, provided that the internal teeth 22 of the planetary gear are sufficiently longer than the gearwheel 23 of the driven axis, to keep them meshing. The consequence of such a displacement is that the roller operates on slightly different radii of the circular structure, and hence the speed ratio is slightly altered. In addition to make possible a synchronizing of an individual generator before its connection to an electric network, certain corrections of the speed ratio of the rollers may be needed under normal operation of the turbine also, in order to obtain an even distribution of the load on a plurality of generators.

An advantage of the possibility of the two different displacements of the roller here mentioned is that, with the roller disconnected from the circular structure, the generator may be used as a motor to bring the roller into rotation, until its surface speed equals that of the surface it is to be brought in contact with, which will reduce the wear of the friction lining.

The system here described, in which the wind forces is transferred via the circular structure and friction linings to a number of stationary rollers, is dependent on a sufficient vertical force on the lines of contact. Even if the circular structure 1 is given a strength sufficient to transfer the wind forces to its bottom surface, it may be necessary to increase its weight by other means. The form of the circular structure shown in FIG. 1, with a top and a bottom connected by substantially cylindrical walls, may to an advantage be utilized by filling it with a cheap, heavy material, such as concrete.

Such a precaution may, in addition, be of advantage in so far as the moment of inertia of the structure is increased. As a consequence, gusts of wind hitting the turbine, or some of the airfoils, will then influence the electricity production to a lesser extent. Further, in a period of fluctuating, slow winds, an increased inertia will help in keeping the power production constant. Still further, within the limits set by the possibilities for a speed ratio variation mentioned above, and if this variation is used for all generators simultaneously, some of the kinetic energy stored in the structure may be converted into electric power, by slightly lowering the speed of rotation of the circular structure, until an increase in the wind velocity again restore normal conditions.

3. The wind turbine as a unit.

It will be understood that a wind turbine according to the present invention to an advantage may be of great extension and take up a considerable piece of ground. Preferably the top of a hill or the summit of a mountain should be chosen for its location. The ground inside the foundation of the turbine will of course be accessible only be special precautions. It is, however, a feature of the present invention that more than one turbine may be located on the same site, concentrically. Admittedly, the wind within the circle of the turbine's airfoils is disturbed to some extent, but more in the form of a deviation from the undisturbed wind's direction toward one side of the turbine, than by turbulence, as is highly the case in the wake behind the propeller of a HAWT, due to its exerting some centrifugal forces on the body of air passing it. To an advantage then, two or more concentrically arranged turbines according to the present invention should have alternating directions of rotation of their wreath of airfoils, so that their influence on the wind direction to some extent may be counteracted.

DESCRIPTION OF AN EXAMPLE OF A PREFERRED EMBODIMENT

Hereinbelow is now given the details of a turbine according to the present invention, together with calculated data on its performance.

Figure 11:
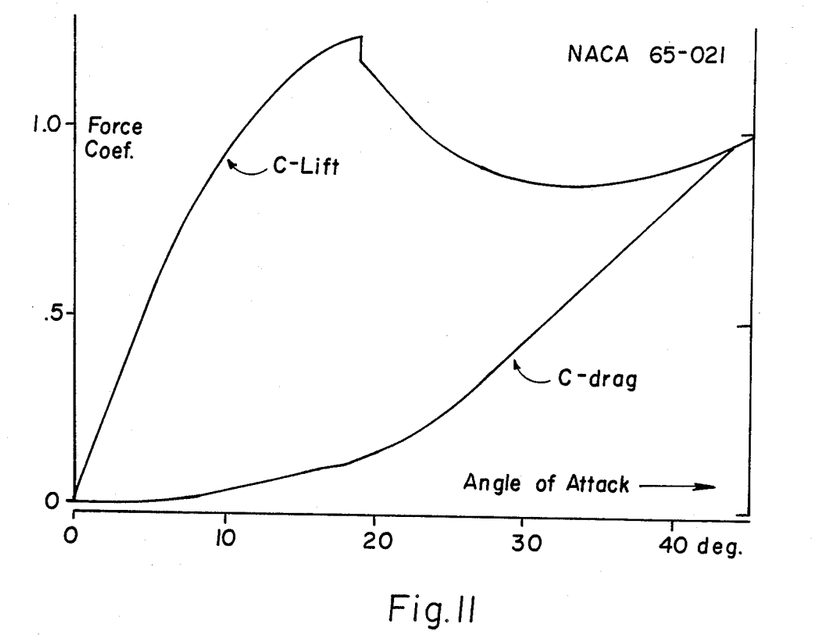

The airfoils are chosen to have a profile known as NACA, 65-021, which also indicates that the maximum thickness of the foil is 21% of its chord. For this profile coefficients of lift and drag are available, and shown for angles of attack up to 45 degrees in FIG. 11. Further, the height of the airfoils is chosen to be 30 meter, their root chord to be 3.6 meter, and their tip chord to be 3 meter. These dimensions determine a factor for the magnitude of the airfoil to be approximately 62.7, which, multiplied by the velocity of the wind raised to the second power and by one of the two coefficients, give the lift and drag force, respectively, in Newton, when the wind velocity is in meter per second.

The circular structure is chosen to have a diameter of 200 meter for the circular track of the airfoils, Airfoils in a chosen number of 90 in the track will then have a spacing of 7 meter, which is considered sufficient to avoid any serious interference between them. The swept area of this turbine is 6000 square meter.

The peripheral velocity of the airfoils is chosen to be 8 meter per second.

Figure 12:
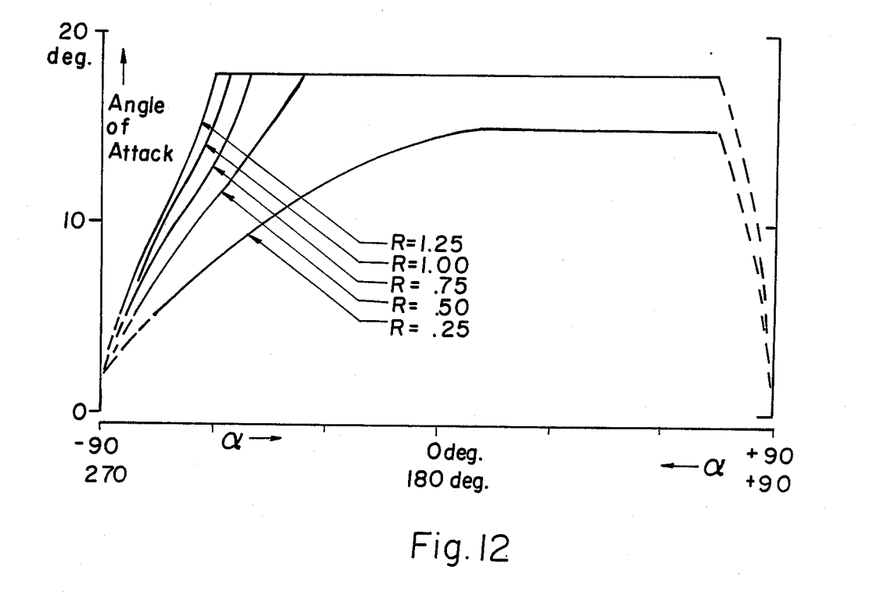

For a number of wind velocities up to 10 m/sec, the tangential components of the wind forces exerted on the airfoils are calculated according to the rules and formulas hereinabove given, for every whole degree of the circumference. The average of these forces is multiplied by the peripheral velocity, to produce the power output in Watt per airfoil. The overall results are given in Table 1, and the optimal angles of attack for the different wind velocities are sketched in FIG. 12, from which is seen that angles of attack near to the stall point is utilized to an increasing extent as the wind velocity increases.

TABLE 1

| Wind velocity, m/sec | International Description of the wind | Maximal angle of attack, degrees | Average tangent'l force, k Newton | Maximal airfoil force, k Newton | Total power prod., M Watt |
| --- | --- | --- | --- | --- | --- |
| 1 | Light air | 11.9 | 0.17 | 3.69 | 0.12 |
| 2 | Light breeze | 15.0 | 0.46 | 5.47 | 0.33 |
| 4 | Gentl' breeze | 17.8 | 1.28 | 9.23 | 0.92 |
| 6 | Modr. breeze | 17.8 | 2.28 | 13.44 | 1.64 |
| 8 | Modr. breeze | 17.8 | 3.56 | 18.10 | 2.56 |
| 10 | Fresh breeze | 17.9 | 5.20 | 23.36 | 3.74 |

For wind velocities above 10 m/sec. a series of maximal angles of attack is chosen to limit the power production. The results of these calculations are given in table 2.

TABLE 2

| Wind velocity, m/sec | International Description of the wind | Maximal angle of attack, degrees | Average tangent'l force, k Newton | Maximal airfoil force, k Newton | Total power prod., M Watt |
| --- | --- | --- | --- | --- | --- |
| 12 | Strong breeze | 8.56 | 5.26 | 20.67 | 3.79 |
| 16 | Moderate gale | 4.23 | 5.22 | 17.24 | 3.76 |
| 20 | Fresh gale | 2.74 | 5.30 | 15.73 | 3.80 |
| 24 | Strong gale | 1.89 | 5.17 | 14.21 | 3.73 |

TABLE 2-continued

| Wind velocity, m/sec | International Description of the wind | Maximal angle of attack, degrees | Average tangent'l force, k Newton | Maximal airfoil force, k Newton | Total power prod., M Watt |
| --- | --- | --- | --- | --- | --- |
| 28 | Whole gale | 1.40 | 5.09 | 13.18 | 3.67 |

It is seen that a wind turbine built according to specifications given in this example, and when operated according to the rules herein set forth, will never overload an (or a number of) electric generator(s) with a rated capacity of 3.8 mega-Watt coupled to it. It is further seen that the maximal wind force exerted upon the airfoils is of the magnitude 24 kilo-Newton, at a wind velocity of 10 m/sec., and that winds of a higher strength, even up to a whole gale,, in reality exert lesser forces upon the airfoils, due to the limitation of the angle of attack.

What is claimed is:

1. A method for extracting power from the wind, including the steps of:

supporting plural airfoils on a circular structure which rotates by coaction of the airfoils with the wind, orienting the plural airfoils in response to wind position and as a function of the changing position of the airfoils as the circular structure rotates, supporting the circular structure on a plurality of roller means, extracting rotational energy from said roller means and adjusting the pressure each roller means exerts on the circular structure as a function of wind power to achieve a normalized output.

2. In a vertical axis wind turbine comprising a number of substantially vertical airfoils arranged in a circular line on a horizontally arranged and substantially circular structure wherein each of the airfoils may be rotated about a vertical axis relative to the circular structure by a governing system and wherein the circular structure simultaneously is free to rotate upon and entirely supported by a number of stationary rollers each supported by a bearing, the improvement comprising: stationary rollers in the form of cones whose vertices coincide with the center of the supported surface of the circular structure, and at least one of said stationary rollers including planetary gear means therein for transferring wind energy to a complementary gear of a stationary energy converter, the wind energy transferred by friction between said stationary roller and the circular structure.

3. The wind turbine described in claim 2, wherein said stationary roller includes a frictional lining on its outer surface to facilitate energy transfer from the circular structure to said stationary roller.

4. The wind turbine described in claim 2, wherein the supporting surface of each of said conical rollers is divided in two segments between which is arranged a bearing of said roller, said bearing being carried on a bell crank type framework having means for displacing said roller to a small extent in a vertical direction, said displacing means for varying roller pressure against the circular structure and for disconnecting said roller from the circular structure.

5. The wind turbine described in claim 21, wherein the bearing of said roller is capable of being displaced along its axis to vary the ratio of the rotational speed of said roller to the rotational speed of the circular structure.

6. The wind turbine described in claim 4, wherein said planetary gear has sufficiently long teeth to engage teeth of said complementary gear of said stationary energy converter when said roller is displaced along its axis of rotation.

7. The wind turbine described in claim 2, wherein the circular structure includes a quantity of a heavy material such as concrete to increase its weight and moment of inertia beyond what is needed for its mechanical strength.

8. The wind turbine described in claim 2, wherein the profile of an airfoil is symmetrical about an axis perpendicular to the chord of the airfoil and is symmetrical about the chord of the airfoil.

9. The wind turbine described in claim 2, wherein the profile of an airfoil is symmetrical about the chord of the airfoil and the airfoil includes a rounded leading edge and a sharp trailing edge.

10. The wind turbine described in claim 2, wherein the profile of an airfoil is curved and includes a rounded leading edge and a sharp trailing edge, and wherein the airfoil is capable of flipping over from one curved form to that of the mirror image form in response to the wind which approaches it.

11. The wind turbine described in claim 2, wherein the governing system comprises for each of the airfoils a positioning motor secured to the circular structure and a worm screw which is driven by the positioning motor and geared with a toothed wheel at the base of the airfoil.

12. The wind turbine described in claim 2, wherein an airfoil includes a number of separate legs extending upward from the base of the airfoil, of which legs two are leaning outward to the extremes of the chord of the profile of the airfoil and the other legs are leaning inward to intermediate points on the rim of the profile of the airfoil, and legs constituting the weakest part of the airfoil under the load of wind forces.

13. The wind turbine described in claim 12, wherein said legs are provided with means responsive to strain and pressure in said legs, said strain and pressure responsive means for transmitting strain and pressure signals to the governing system.

14. The wind turbine described in claim 8, wherein the airfoils may be caused by the governing system to follow a pattern in which an airfoil moving directly windward has its chord parallel to the wind direction and an airfoil moving directly leeward has its chord in right angle to the wind direction while an airfoil in an intermediate position in one hemicycle steadily increases its angle to the wind direction and an airfoil in the other hemicycle steadily decreases its angle to the wind direction.

15. The wind turbine described in claims 9 or 10, wherein the airfoils are oriented by the governing system through the greater part of their circular track, to have angles of attack to the wind approaching them so that the sum of the tangential components of the wind forces exerted upon them are nearly maximized in the direction of the rotation, except in a smaller sector around the point where they are moving leeward.

16. The wind turbine described in claims 9 or 10, wherein the airfoils are oriented by the governing system through a smaller sector around the point where they are moving leeward, to have their leading edge pointed toward the undisturbed wind when the wind velocity exceeds the airfoil's peripheral velocity and to have their trailing edge pointed toward the undisturbed wind when the wind velocity is less than the airfoil's peripheral velocity.

17. The wind turbine described in claims 9 or 10, wherein the airfoils are oriented by the governing system to have angles of attack relative to the wind approaching them, of a magnitude that makes the sum of the tangential components of the wind forces substantially independent of the velocity of the undisturbed wind when this velocity exceeds a chosen value.

18. A plurality of wind turbines described in claim 2, arranged concentrically and operated so that the directions of rotation of the turbines alternate.

19. In a vertical axis wind turbine comprising a number of substantially vertical airfoils arranged in a circular line on a horizontally arranged and substantially circular structure, wherein each of the airfoils may be rotated about a vertical axis relative to the circular structure by a governing system and wherein the circular structure simultaneously is free to rotate upon and entirely supported by a number of stationary rollers, each supported by a bearing, the improvement comprising airfoils including a number of separate leg portions extending upward from the base of the airfoil, of which leg portions two are leaning outward to the extremes of the chord of the profile of the airfoil and the other leg portions are leaning inward to intermediate points on the rim of the profile of the airfoil, said leg portions constituting the weakest part of the airfoil under the load of wind forces.

20. The wind turbine described in claim 19, wherein said legs are provided with means responsive to strain and pressure in said legs, said strain and pressure responsive means for transmitting strain and pressure signals to the governing system.

21. In a vertical axis wind turbine comprising a number of substantially vertical airfoils arranged in a circular line on a horizontally arranged and substantially circular structure, wherein each of the airfoils may be rotated about a vertical axis relative to the circular structure by a governing system and wherein the circular structure simultaneously is free to rotate upon and entirely supported by a number of stationary rollers each supported by a bearing, the improvement comprising stationary rollers in the form of cones whose vertices coincide with the center of the supported surface of the circular structure.

22. In a vertical axis wind turbine comprising a number of substantially vertical airfoils arranged in a circular line on a horizontally arranged and substantially circular structure, wherein each of the airfoils may be rotated about a vertical axis relative to the circular structure by a governing system and wherein the circular structure simultaneously is free to rotate upon and entirely supported by a number of stationary rollers each supported by a bearing, the improvement comprising at least one of said stationary rollers including planetary gear means therein for transferring wind energy to a complementary gear of a stationary energy converter, the wind energy transferred by friction between said stationary roller and the circular structure.

23. A method of governing a vertical axis wind turbine comprising a number of substantially vertical airfoils arranged in a circular line on a horizontally arranged and substantially circular structure, wherein each of the airfoils may be rotated about a vertical axis relative to the circular structure by a governing system and wherein the circular structure simultaneously is free to rotate upon and entirely supported by a number of stationary rollers each supported by a bearing, said method comprising the steps:
  causing the airfoils by the governing system to follow a pattern in which the airfoil moving directly windward has its chord parallel to the wind direction and the airfoil moving directly leeward has its chord in right angle to the wind direction while airfoils in intermediate positions in one hemicycle steadily increase their angle to the wind direction and airfoils in the other hemicycle decrease their angle to the wind direction.
  orienting the airfoils by the governing system through the greater part of the circular track, except in a smaller sector around the point where they are moving leeward, to have angles of attack to the wind approaching them so that the sum of the tangential components of the wind forces exerted upon them are nearly maximized in the direction of the rotation,
  orienting the airfoils by the governing system through a smaller sector around the point where they are moving leeward, to have their leading edge pointed toward the undisturbed wind when the wind velocity exceeds the airfoil's peripheral velocity and to have their trailing edge pointed toward the undisturbed wind when the wind velocity is less than the airfoil's peripheral velocity, and
  orienting the airfoils by the governing system to have angles of attack relative to the wind approaching them, of a magnitude that makes the sum of the tangential components of the wind forces nearly independent of the velocity of the undisturbed wind when their velocity exceeds a chosen value.

* * * * *

UNITED STATES PATENT AND TRADEMARK OFFICE
CERTIFICATE OF CORRECTION

PATENT NO. : 4,832,569

DATED : May 23, 1989

INVENTOR(S) : Samuelson et al

It is certified that error appears in the above—identified patent and that said Letters Patent are hereby corrected as shown below:

Column 13, line 66, "21" should be -- 2 -- .

Column 14, line 11, "4" should be -- 5 -- .

Signed and Sealed this

Thirteenth Day of February, 1990

Attest:

JEFFREY M. SAMUELS

*Attesting Officer*  *Acting Commissioner of Patents and Trademarks*